United States Patent [19]

Randolph et al.

[11] E Patent Number: Re. 32,681

[45] Reissued Date of Patent: May 31, 1988

[54] THREE WHEEL VEHICLE

[76] Inventors: Travis M. Randolph, P.O. Box 505; Charles P. Schreiner, P.O. Box 711, both of Saugatuck, Mich. 49453

[21] Appl. No.: 786,813

[22] Filed: Oct. 11, 1985

Related U.S. Patent Documents

Reissue of:

[64] Patent No.: 4,408,776
Issued: Oct. 11, 1983
Appl. No.: 251,216
Filed: Apr. 6, 1981

[51] Int. Cl.[4] ..... B62K 5/04; B62K 21/00; B62M 1/02

[52] U.S. Cl. ..... 280/261; 280/274; 280/282

[58] Field of Search ..... 280/282, 261, 274, 275, 280/270, 92

[56] References Cited

U.S. PATENT DOCUMENTS

| | | | |
|---|---|---|---|
| 223,691 | 1/1880 | Allen | 280/235 |
| 431,060 | 7/1890 | Kenney | 280/222 |
| 841,635 | 1/1907 | Dailey | 280/261 |
| 1,321,258 | 11/1919 | Stinson | 280/92 X |
| 2,207,161 | 7/1940 | Roe | 280/269 |
| 2,501,035 | 3/1950 | Doak et al. | 280/259 |
| 2,815,222 | 12/1957 | Harrison | 280/261 |
| 3,539,196 | 11/1970 | Fleming | 280/92 |
| 3,909,043 | 9/1975 | Black | 280/269 |
| 3,913,929 | 10/1975 | Matsuura | 280/7.14 |
| 3,960,392 | 6/1976 | Read | 280/282 |
| 4,047,729 | 9/1977 | Smith | 280/267 |

FOREIGN PATENT DOCUMENTS

| | | | |
|---|---|---|---|
| 961579 | 3/1957 | Fed. Rep. of Germany | 280/92 |

*Primary Examiner*—John A. Pekar
*Attorney, Agent, or Firm*—John A. Waters

[57] ABSTRACT

A three wheel vehicle is provided with improved drive and handling characteristics, especially when turning. The three wheel vehicle includes a frame with a pair of front wheel and axle assemblies rotatably mounted on either side near the front of the frame. A rear fork, wheel and axle assembly is mounted at the rear center of the frame which is rotatable and laterally pivotable for turning the vehicle. Steering means are provided for rotating the fork and pivoting the fork laterally in a direction opposite the direction of turning the vehicle. Preferred drive means provide two wheel positive forward drive and pedal actuated independent dual braking.

14 Claims, 1 Drawing Sheet

THREE WHEEL VEHICLE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to three wheel vehicles, and, more particularly, to a three wheel vehicle with improved drive and handling characteristics.

2. Description of the Prior Art

In these days of widespread interest in energy conservation and concern over rapidly depleting petroleum supplies, energy efficient transportation has received much attention. In addition, an increased awareness of the contribution of automobiles to air and noise pollution and highway conjestion have also caused a reevaluation of our transportation methods. Although in modern times, manually operated cycles such as bicycles and tricycles have been used primarily among the young or for recreational or exercise purposes, these cycles have become increasingly important as means for energy efficient and pollution-free transportation. Accordingly, there has been considerable activity in the cycle industry and by concerned citizens in general in attempting to improve these vehicles to enhance their comfort, handling and stability characteristics so as to encourage more widespread use. With respect to tricycles or three wheel vehicles, one constant problem has been the tendency of them to tip when cornering. A second area of interest with respect to tricycles has been to improve conventional tricycle drive and braking systems. Thus, there is a present desire and, in fact, a need for improved manually operated or motor assisted cycles, especially tricycles since they can provide increased rider comfort as well as better storage capabilities as compared with bicycles.

SUMMARY OF THE INVENTION

According to the present invention, there is provided a three wheel vehicle which has improved stability, handling and steering capabilities and which also includes an improved drive and braking system. The three wheel vehicle of the present invention includes a frame with a pair of front wheel and axle assemblies rotatably mounted on either side near the front of the frame. A rear wheel fork is mounted at the rear center of the frame rotatably about a generally vertical axis and pivotably laterally. Preferably, the fork is tilted slightly from an exact vertical axis, as shown in FIG. 1, for increased stability as discussed hereinafter. A rear wheel and axle assembly is rotatably mounted in the fork, and steering means are provided for rotating the fork and for pivoting the fork laterally in a direction opposite the direction of turning the vehicle.

The rear wheel fork is mounted to the frame preferably by a generally horizontal strut member with the proximal end of the strut member being pivotably mounted at the rear center of the frame and the fork being rotatably mounted at the distal end of the strut member. The strut member is pivotally mounted by means of a generally vertical shaft rigidly affixed to the proximal end of the strut with the shaft being rotatably mounted at the rear center of the frame.

The preferred steering means includes a steering wheel rotatably mounted near the front of the frame with a steering sprocket at the lower end thereof. A pair of sprockets are rigidly affixed to the end of the shaft which depends below the rear strut. A sprocket is rigidly mounted near the top end of the fork below the strut. A first endless loop chain interconnects the steering wheel sprocket with one of the shaft sprockets, and a second endless loop chain interconnects the other of the shaft sprockets and the fork sprocket.

For improved stability upon turning, a guide means is preferably provided at the rear of the frame which engages the fork for stabilizing the fork when the strut is pivoted laterally. The preferred guide means includes a generally horizontal guide plate or frame mounted at the rear of the frame in front of the fork and below the strut. The guide plate has an arcuate rear portion. A guide sprocket is affixed to the upper end of the fork and below the strut and in the same general plane as the guide plate. A guide chain engages the guide sprocket with its free ends attached to either side of the guide plate.

A follower assembly is provided between the guide plate and the guide sprocket mounted transversely to the strut which includes a rigid arm having horizontal rollers mounted below the ends thereof. The space between the rollers is less than the diameter of the guide sprocket, and the guide chain passes between the rollers and in contact therewith.

Drive means are provided for positively driving at least one of the front wheels of the vehicle. In the preferred drive means, both front wheels are positively driven and independently braked. The preferred drive means includes a rotatable pedal and drive sprocket assembly mounted at the front center of the frame or off center in the case of a two passenger vehicle. A transverse axle is rotatably mounted on the frame between the pedal and the drive sprocket assembly and the rear of the frame. A solid mounted sprocket is provided on each end of the transverse drive axle. A free-wheeling sprocket assembly in engageable alignment with the transverse axle assembly end sprockets, respectively. Each front wheel and axle assembly also preferably includes a brake means, with coaster brakes being especially preferred.

A transmission assembly is rotatably mounted on the frame between the transverse axle and the pedal and drive sprocket assembly and has first, second and third solid mounted transmission sprockets, with the first transmission sprocket being in chain engageable alignment with the drive sprocket. A first free-wheeling sprocket is mounted on the transverse axle in the forward drive orientation in chain engageable alignment with the third transmission sprocket. A second free-wheeling sprocket is mounted on the transverse axle in the reverse drive orientation in chain engageable alignment with the second transmission sprocket.

Endless loop chains interconnect each of the front wheel sprockets and the corresponding transverse axle end sprockets, the drive sprocket and the first transmission sprocket, the second transmission sprocket and the second free-wheeling sprocket, and the third transmission sprocket and the first free-wheeling sprocket.

Although the preferred embodiment of the present invention contemplates two front wheels and a single steerable rear wheel, the steering and drive improvements of the present invention can be utilized in a tricycle with a pair of rear wheels and a single front steerable wheel. Also, the transmission assembly could be located forward of the pedal and sprocket assembly.

DESCRIPTION OF THE PREFERRED EMBODIMENTS

Figure 1:
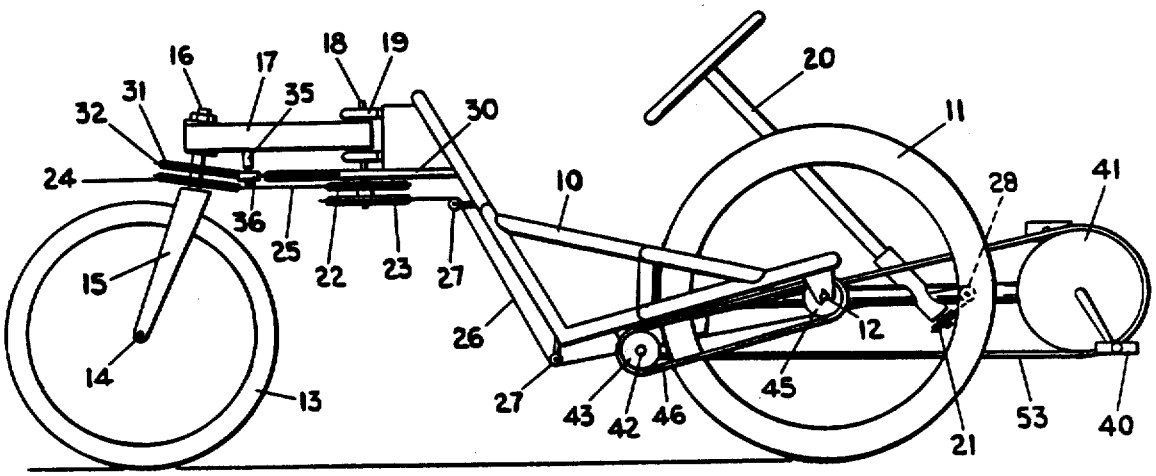
FIG. 1 is a side elevational view of the three wheel vehicle of the present invention.

Referring to the drawings in greater detail, the unique three wheel vehicle of the present invention includes a frame 10, a pair of front wheel and axle assemblies including wheels 11 and axles 12, and a rear wheel and axle assembly including rear wheel 13 and axle 14. Wheels 11 are mounted on either side near the front of frame 10 and rear wheel 13 is mounted at the rear center of frame 10.

Steering of the three wheel vehicle is accomplished by the turning of rear wheel 13. To provide turning capability for wheel 13, the rear wheel and axle assembly is rotatably mounted in fork 15. At the top of fork 15 is integral mandral 16 which is rotatably mounted through an aperture in the distal end of strut 17. The proximal end of strut 17 is, in turn, pivotably mounted to the rear center of frame 10 by means of rigidly attached shaft 18 which is rotatably mounted in bearing guides 19 on frame 10. The purpose of utilizing pivoting strut 17 in the mounting of rear wheel 13 is so that when rear wheel 13 is turned for steering the vehicle, strut 17 is simultaneously pivoted in the direction opposite the direction of the turn to thereby move wheel 13 laterally as shown in phantom in FIG. 2 to prevent tipping of the vehicle during the turning sequence, especially at higher speeds. In addition, a smaller turning radii is provided for the vehicle.

The turning of wheel 13 and the lateral displacement thereof via the pivoting of strut 17 are accomplished by a steering assembly which includes steering wheel 20, which is rotatably mounted near the front of frame 10 and which has a steering sprocket 21 at the lower end thereof. Strut shaft 18 depends below strut 17, and a pair of sprockets 22 and 23 are rigidly affixed to the depending end of shaft 18. A fork sprocket 24 is rigidly mounted to fork mandral 16 below strut 17 to be chain engageable with shaft sprocket 22. Endless loop chain 25 interconnects fork sprocket 24 and sprocket 22. A second endless loop chain 26 interconnects sprocket 23 with steering sprocket 21 via guide pulleys 27 and 28 which are attached to frame 10. Because chain 26 passes around pulley 28, the rear wheel will be turned in a direction opposite the intended turning direction.

In order to provide increased stability for fork 15 and thus rear wheel 13 when turning, guide means are provided at the rear of frame 10. As shown, the guide means includes a generally horizontal guide plate or frame 30 mounted at the rear of frame 10 in front of fork 15 and below strut 17. Guide plate 30 has an arcuate rear portion which has a radius which is sized so that the guide follower assembly, discussed below, maintains the guide chain in contact therewith during lateral displacement of strut 17. Guide sprocket 31 is affixed to mandral 16 above guide sprocket 24 and below strut 17 and in the same general plane as guide plate 30. Guide chain 32 engages guide sprocket 31 with the free ends thereof 33 and 34 being attached to each side of guide plate 30, respectively.

A follower assembly is provided between guide plate 30 and guide sprocket 32 and is mounted transversely to strut 17. The follower assembly includes a rigid arm 35 with horizontal rollers 36 mounted below each end thereof. The space between the rollers is less than the diameter of guide sprocket 31, and guide chain 32 passes between rollers 36 in contact therewith.

The operation of the steering means is initiated by turning steering wheel 20. Upon turning steering wheel 20, steering sprocket 21 will be turned to turn shaft sprocket 23 via chain 26. The rotation of shaft sprocket 23 causes shaft 18 to rotate thereby pivoting strut 17 laterally to a position opposite the direction of turning such as shown in phantom in FIG. 2. Simultaneously, the rotation of shaft sprocket 23 will cause shaft sprocket 22 to rotate to thereby rotate fork sprocket 24 via chain 25 to rotate fork 15 and thus turn wheel 13, also as shown in phantom in FIG. 2. Finally, the rotation of fork sprocket 214 causes fork sprocket 31 to rotate thereby permitting guide chain 32 to be fed out between roller 36 on the side of the turning direction and guide plate 30 while chain 32 at all times maintains tension between fork 15 and frame 10 for increased stability.

Figure 2:
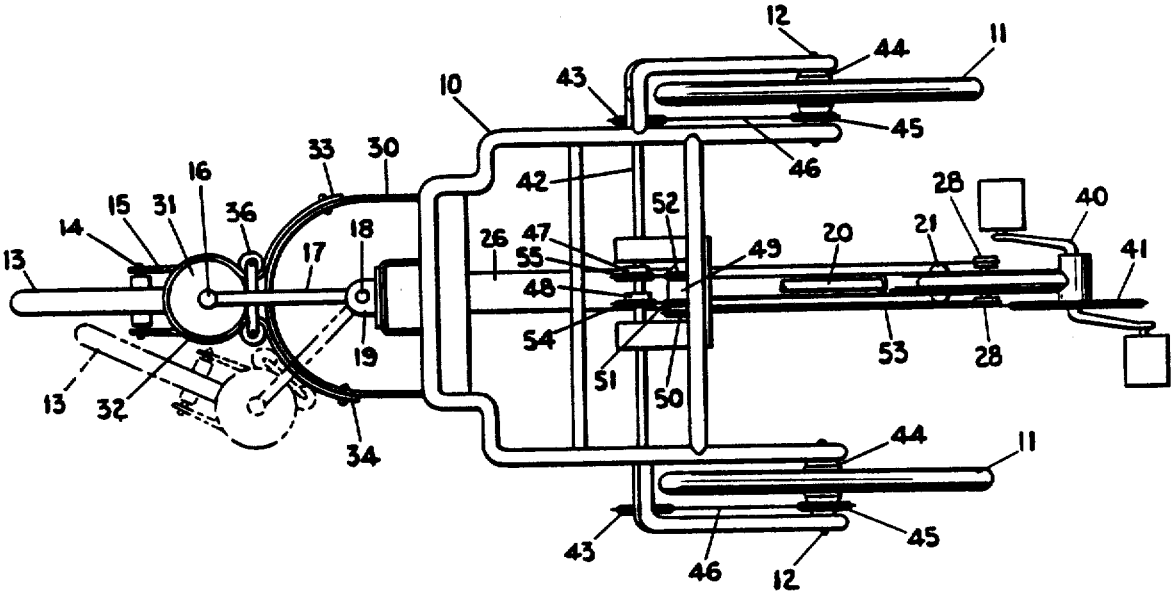
FIG. 2 is a plan view of the three wheel vehicle of the present invention with the rear wheel shown in phantom in a turning position.

Thus, by this steering mechanism, upon turning a corner, the lateral displacement of rear wheel 13, as shown in phantom in FIG. 2, prevents tipping of the vehicle. In addition, by a tilted mounting of fork 15 which is preferred, as shown in FIG. 1, the contact point of rear wheel 13 with the ground is shifted further from the vehicle center line to further increase the vehicle stability beyond the amount of lateral displacement contributed by the displacement of strut 17. When a turn is completed, the steering wheel is turned in the opposite direction and the reverse of the above sequence takes place to return rear wheel 13 to the straight-ahead position or beyond to an opposite turning direction. Because of the unique construction of the steering mechanism, a smooth, continuous and wobble-free steering action is achieved, while greatly enhancing the stability of the vehicle during turns and providing a smaller turning radii.

While conventional driving means can be employed to move the vehicle, including a power drive or power assisted manual drive, the preferred embodiment of the present invention includes a unique drive system which provides two-wheel positive drive and independent dual braking. In the preferred drive system, a rotatable pedal and drive sprocket assembly is mounted at the front center of frame 10 (or off center in a two passenger vehicle) which includes pedal assembly 40 and solid mounted drive sprocket 41. Transverse axle 42 is rotatably mounted on frame 10, preferably, between the pedal and drive sprocket assembly and the rear of the frame at about the mid-point of frame 10. Solid mounted sprockets 43 are provided on each end of axle 42. Free-wheeling sprocket assemblies 44 are mounted on each front wheel and axle assembly, with sprockets 45 being in chain engageable alignment with sprockets 43, respectively. A pair of endless loop chains 46 interconnect sprockets 43 and 45, respectively. In the preferred embodiment, each sprocket assembly 44 includes a brake means such as a conventional coaster brake or a disc brake which is actuated when the direction of rotation of the sprockets 45 is reversed.

A pair of free-wheeling sprockets 47 and 48 are mounted near the center of axle 42 side by side. Free-wheeling sprockets 47 and 48 can be of the conventional construction which employs a ratchet device having a ratchet wheel and pawl. These free-wheeling sprockets, which are commonly used on multi-speed bicycles, provide a rotational drive force when pedalling and permit continued rotation or coasting when pedalling is stopped and when backpedalling. Free-wheeling sprocket 47 is mounted so that the drive force is provided when pedalling in the forward direction. Free-wheeling sprocket 48 is mounted in the reverse direction so that a drive force is provided when the pedals are pedalled in reverse.

A transmission assembly 49 is rotatably mounted on frame 10 in front of free-wheeling sprockets 47 and 48. Transmission assembly 49 has three solid mounted sprockets 50, 51 and 52. Sprocket 50 is in chain engagement alingment with drive sprocket 41 and is interconnected therewith by endless loop chain 53. Reverse drive sprocket 48 is in chain engageable alignment with transmission sprocket 51 and is connected therewith by endless loop chain 54. Forward drive sprocket 47 is in chain engageable alignment with transmission sprocket 52 and is interconnected therewith by endless loop chain 55. The operation of the unique drive assembly may now be described.

When pedal assembly 40 is pedalled in the forward direction, drive sprocket 41 is rotated to rotate sprocket 50 in the forward direction via chain 53. The forward rotation of sprocket 50 rotates sprocket 51 in the forward direction and through transmission 49 rotates sprocket 52 in the forward direction. The rotation of sprocket 52 in the forward direction causes free-wheeling forward drive sprocket 47 to rotate in the forward direction via chain 55. The rotation of free-wheeling sprocket 47 causes axle 42 to rotate to thereby rotate sprockets 43 in the forward direction. The rotation of sprockets 43 in turn cause sprockets 45 to rotate in the forward direction via chains 46 to rotate wheels 11 to provide forward motion. Since free-wheeling sprocket 48 is free-wheeling when the pedals are rotated in the forward direction, it is passive in this mode of operation of the vehicle and just freely rotates. If pedalling is stopped, free-wheeling sprocket asemblies 44 permit wheels 11 to continue rotating. The rotation of shaft 42 is also permitted to continue by free-wheeling sprockets 47 and 48.

If pedal assembly 40 is pedalled in the reverse direction, drive sprocket 41 will be turned in the reverse direction causing sprocket 50 to be turned in a reverse direction via chain 53. Turning of sprocket 50 in the reverse direction will cause sprocket 51 to turn in the reverse direction which will then rotate sprocket 48 in the reverse direction via chain 54. Since a reverse rotation for sprocket 48 is its drive position because of its reverse mounting on axle 42, this rotation of sprocket 48 will cause axle 42 to rotate in the reverse direction thereby rotating sprockets 43 in the reverse direction. Upon rotating sprockets 43 in the reverse direction, sprockets 45 will rotate in the reverse direction via chain 46 to actuate brakes such as coaster brakes or disc brakes on both front wheels.

This unique drive and braking system is especially important when turning the vehicle. With independent free-wheeling sprockets mounted on each of the front wheels, upon turning the vehicle, the outside or faster wheel is permitted to coast while the drive is directed to the inside wheel which must move slower. Also, with brakes on both front wheels, smooth and uniform braking is achieved.

While the preferred embodiments of the present invention have been described and illustrated, it will be obvious to those skilled in the art that various modifications may be made without departing from the scope of the present invention. For example, while a passenger type of tricycle or three wheel vehicle has been described and illustrated, the unique steering and drive and brake means are also ideally suited for three wheel vehicles such as golf carts, utility carts, three wheel motorcycles and even automobiles and the like. It is also to be understood that while the use of a variety of chains and sprockets have been described, suitable pulleys and belts can be employed instead with satisfactory results. Accordingly, through the specification and claims, the terminology sprockets and chains are meant to include pulleys and belts and the like. Thus, the scope of the present invention is deemed to be limited only by the following claims.

The embodiments of the invention in which an exclusive property or privilege is claimed are defined as follows:

1. A three wheel vehicle comprising:
- a frame;
- a pair of front wheel and axle assemblies rotatably mounted on either side near the front of said frame;
- means on said frame for driving at least one of said front wheels;
- a strut member having its proximal end pivotably mounted in a generally horizontal plane at the rear center of said frame with its distal end extending behind said frame;
- a rear wheel fork rotatably mounted at the distal end of said strut member so as to be rotatable about a generally vertical axis;
- a rear wheel and axle assembly rotatably mounted in said fork; and
- steering means including means for rotating said fork about a generally vertical axis to turn said vehicle and means for simultaneously pivoting said strut member in a generally horizontal plane to displace said fork laterally with respect to the vehicle in a direction opposite the direction of turning the vehicle.

2. A three wheel vehicle according to claim 1 wherein said proximal end of said strut member is pivotably mounted at the rear center of said frame by means of a generally vertical shaft rigidly affixed to said proximal end of said strut member, said shaft being rotatably mounted about a generally vertical axis at the rear center of said frame.

3. A three wheel vehicle according to claim 2 wherein said shaft depends below said strut and wherein said steering means comprises:
- a steering wheel rotatably mounted near the front of said frame with a steering sprocket at the lower end thereof;
- a pair of sprockets rigidly affixed to said depending end of said shaft;
- a sprocket rigidly mounted near the top end of said fork below said strut;
- a first endless loop chain interconnecting said steering wheel sprocket and one of said shaft sprockets; and
- a second endless loop chain interconnecting the other of said shaft sprockets and said fork sprocket.

4. A three wheel vehicle according to claim 2 further comprising guide means at the rear of said frame engaging said fork for stabilizing said fork when said strut is pivoted to displace said fork laterally with respect to the vehicle.

5. A three wheel vehicle according to claim 4 wherein said guide means comprises:

a generally horizontal guide plate mounted at the rear of said frame in front of said fork and below said strut, said guide plate having an arcuate rear portion;

a guide sprocket affixed to the upper end of said fork below said strut and in the same general plane as said guide plate;

a guide chain engaging said guide sprocket with the free ends of said guide chain being attached to either side of said guide plate; and a follower assembly between said guide plate and said guide sprocket mounted transversely to said strut comprising a rigid arm having horizontal rollers mounted below each end, the space between said rollers being less than the diameter of said guide sprocket and said guide chain passing between said rollers and in contact therewith.

6. A three wheel vehicle according to claim 1 wherein said driving means comprises:

a rotatable pedal and drive sprocket assembly mounted at the front of said frame;

a transverse axle rotatably mounted on said frame;

a solid mounted sprocket on each end of said transverse axle;

a free-wheeling sprocket assembly mounted on each front wheel and axle assembly in chain engagement alignment with said transverse axle end sprockets, respectively;

a transmission assembly rotatably mounted on said frame having first, second and third solid mounted transmission sprockets, said first transmission sprocket being in chain engageable alignment with said drive sprocket;

a first free-wheeling sprocket mounted on said transverse axle in the forward drive orientation in chain engageable alignment with said third transmission sprocket;

a second free-wheeling sprocket mounted on said transverse axle in the reverse drive orientation in chain engageable alignment with said second transmission sprocket; and endless loop chains interconnecting each of said front wheel sprockets and said corresponding transverse axle end sprockets, said drive sprocket and said first transmission sprocket, said second transmission sprocket and said second free-wheeling sprocket, and said third transmission sprocket and said first free-wheeling sprocket.

7. A three wheel vehicle according to claim 6 further comprising brake means mounted on each of said front wheel and axle assemblies actuatable when said front wheel free-wheeling sprocket assemblies are rotated in the reverse direction.

*8. A three wheel vehicle comprising:*

*a frame having front and rear ends;*

*a pair of wheels rotatably mounted on either side near one end of said frame;*

*a strut member having its proximal end pivotably mounted in a generally horizontal plane at the center of the other end of said frame with its distal end extending rearwardly with respect to said frame;*

*a fork rotatably mounted at the distal end of said strut member so as to be rotatable about a generally vertical axis;*

*a steerable wheel rotatably mounted in said fork;*

*steering means including means for rotating said fork about a generally vertical axis to turn said vehicle and means for simultaneously pivoting said strut member in a generally horizontal plane to displace said fork laterally with respect to the vehicle in a direction opposite the direction of turning the vehicle; and*

*means on said frame for driving at least one of said wheels.*

*9. A three wheel vehicle according to claim 8 wherein said proximal end of said strut member is pivotably mounted at the center of said frame by means of a generally vertical shaft rigidly affixed to said proximal end of said strut member, said shaft being rotatably mounted about a generally vertical axis at the center of said frame.*

*10. A three wheel vehicle according to claim 9 wherein said shaft depends below said strut and wherein said steering means comprises:*

*a steering wheel rotatably mounted near the front of said frame with a steering sprocket at the lower end thereof;*

*a pair of sprockets rigidly affixed to said depending end of said shaft;*

*a sprocket rigidly mounted near the top of said fork below said strut;*

*a first endless loop chain interconnecting said steering wheel sprocket and one of said shaft sprockets; and*

*a second endless loop chain interconnecting the other of said shaft sprockets and said fork sprocket.*

*11. A three wheel vehicle according to claim 9 further comprising guide means on said frame engaging said fork for stabilizing said fork when said strut is pivoted to displace said fork laterally with respect to the vehicle.*

*12. A three wheel vehicle according to claim 11 wherein said guide means comprises:*

*a generally horizontal guide plate mounted to said frame in front of said fork and below said strut, said guide plate having an arcuate rear portion;*

*a guide sprocket affixed to the upper end of said fork below said strut and in the same general plane as said guide plate;*

*a guide chain engaging said guide sprocket with the free ends of said guide chain being attached to either side of said guide plate; and*

*a follower assembly between said guide plate and said guide sprocket mounted transversely to said strut comprising a rigid arm having horizontal rollers mounted below each end, the space between said rollers being less than the diameter of said guide sprocket and said guide chain passing between said rollers and in contact therewith.*

*13. A three wheel vehicle according to claim 8 wherein said driving means comprises;*

*a rotatable pedal and drive sprocket assembly mounted at the front of said frame;*

*a transverse axle rotatably mounted on said frame;*

*a solid mounted sprocket on each end of said transverse axle;*

*a free-wheeling sprocket assembly mounted on each of said pair of wheels in chain engagement alignment with said transverse axle end sprockets, respectively;*

*a sprocket assembly rotatably mounted on said frame having first, second and third solid mounted transmission sprockets, said first transmission sprocket being in chain engageable alignment with said drive sprocket;*

*a first free-wheeling sprocket mounted on said transverse axle in the forward drive orientation in chain engageable alignment with said third transmission sprocket;*

*a second free-wheeling sprocket mounted on said transverse axle in the reverse drive orientation in chain engageable alignment with said second transmission sprocket; and*

*endless loop chains interconnecting said sprockets on said pair of wheels with said corresponding transverse axle end sprockets, said drive sprocket with said first transmission sprocket, said second transmission sprocket with said second free-wheeling sprocket, and said third transmission sprocket with said first free-wheeling sprocket.*

*14. A three wheel vehicle according to claim 13 further comprising brake means operably connected to each of said pair of wheels and actuatable when said free-wheeling sprocket assemblies are rotated in the reverse direction.*

* * * * *

UNITED STATES PATENT AND TRADEMARK OFFICE

CERTIFICATE OF CORRECTION

PATENT NO. : Re. 32,681

DATED : May 31, 1988

INVENTOR(S) : Travis M. Randolph; Charles P. Schreiner

It is certified that error appears in the above-identified patent and that said Letters Patent are hereby corrected as shown below:

Col. 2, line 41

After the word "assembly" insert the phrase -- is mounted on each front wheel and axle assembly --;

Col. 4, line 22

Delete the numeral "214" and substitute the numeral -- 24 --;

Claim 13, col. 8, line 65

Delete the word "sprocket" and substitute the word -- transmission --.

Signed and Sealed this

Eighth Day of November, 1988

*Attest:*

DONALD J. QUIGG

*Attesting Officer*

*Commissioner of Patents and Trademarks*